(12) United States Patent
Rey et al.

(10) Patent No.: US 9,962,032 B2
(45) Date of Patent: May 8, 2018

(54) MIXING DEVICE FOR FROTHING BEVERAGES AND METHOD OF USING SAME

(71) Applicant: NESTEC S.A., Vevey (CH)

(72) Inventors: Cedric Rey, La Sarraz (CH); Roberto Angelo Calderone, Orbe (CH); Fabien Rawyler, Pully (CH); Patrice Candaux, Chamblon (CH)

(73) Assignee: Nestec S.A., Vevey (CH)

( * ) Notice: Subject to any disclaimer, the term of this patent is extended or adjusted under 35 U.S.C. 154(b) by 586 days.

(21) Appl. No.: 14/390,880

(22) PCT Filed: Mar. 28, 2013

(86) PCT No.: PCT/EP2013/056728
§ 371 (c)(1),
(2) Date: Oct. 6, 2014

(87) PCT Pub. No.: WO2013/149942
PCT Pub. Date: Oct. 10, 2013

(65) Prior Publication Data
US 2015/0079257 A1    Mar. 19, 2015

(51) Int. Cl.
*A23L 2/54* (2006.01)
*A47J 31/44* (2006.01)
(Continued)

(52) U.S. Cl.
CPC ......... *A47J 31/4496* (2013.01); *A23C 9/1524* (2013.01); *A23L 2/54* (2013.01);
(Continued)

(58) Field of Classification Search
CPC ... A47J 31/401; A47J 31/4496; B01F 7/0075; A23C 9/1524; A23L 2/54; A23V 2002/00
See application file for complete search history.

(56) References Cited

U.S. PATENT DOCUMENTS 3,140,861 A    7/1964   Krup
8,070,019 B2  12/2011   Stettes
(Continued)

FOREIGN PATENT DOCUMENTS

EP    1316283       6/2003
ES    2315338 T3    4/2009
(Continued)

OTHER PUBLICATIONS

Chinese Patent Office Action for Application No. 201380029245.0, dated Nov. 15, 2016, 20 pages.

*Primary Examiner* — Anthony Weier
(74) *Attorney, Agent, or Firm* — K&L Gates LLP

(57) ABSTRACT

The invention concerns a mixing device (1) having: —a whipper housing (2), a rotor (3) and a back wall (4), the whipper housing and the back wall forming a whipper chamber in which is lodged the rotor, —the whipper housing having a beverage inlet (11) and a beverage outlet (7), —a drive shaft (41) for driving the rotor, said drive shaft being supported by the back wall, —the rotor presenting a radial back surface (33) facing the whipper housing back wall (4) and a radial front surface (32) opposed to the radial back surface —the whipper housing having a front wall (21), said front wall facing at least a part of the radial front surface (32) of the rotor, and wherein the whipper housing front wall (21) presents bumps (5) elevating from the surface (211) of the front wall, the upper surface (51) of each bump being flat and the edges (52) of said upper surface being sharp.

19 Claims, 3 Drawing Sheets

(51) Int. Cl.
*A47J 31/40* (2006.01)
*B01F 7/00* (2006.01)
*A23C 9/152* (2006.01)

(52) U.S. Cl.
CPC ......... *A47J 31/401* (2013.01); *B01F 7/00775* (2013.01); *A23V 2002/00* (2013.01)

(56) References Cited

U.S. PATENT DOCUMENTS

| | | |
|---|---|---|
| 9,084,510 B2 * | 7/2015 | Scorrano ............... A47J 31/401 |
| 2003/0142582 A1 | 7/2003 | Utracki et al. |

FOREIGN PATENT DOCUMENTS

| | | |
|---|---|---|
| JP | 4051033 | 2/2008 |
| WO | 2008013452 | 1/2008 |

* cited by examiner

MIXING DEVICE FOR FROTHING BEVERAGES AND METHOD OF USING SAME

CROSS REFERENCE TO RELATED APPLICATIONS

The present application is a National Stage of International Application No. PCT/EP2013/056728, filed on Mar. 28, 2013, which claims priority to European Patent Application No. 12163207.9, filed Apr. 4, 2012, the entire contents of which are being incorporated herein by reference.

FIELD OF THE INVENTION

The present invention relates to a mixing device for preparing frothy beverages

BACKGROUND OF THE INVENTION

Many frothy beverages like milk beverages, chocolate beverages, . . . are often prepared by mixing a food soluble powder or a food liquid concentrate with a diluent. Mixing devices are known for speedier preparation of such beverages by mixing the soluble food component with the diluent, such as water. These devices typically comprise a mixing chamber in which the soluble component and the diluent are fed. The diluent can be introduced into the dissolution chamber in order to create a whirlpool to efficiently dissolve the soluble component in the hot water or the hot diluent can be introduced under the form of jets that provides mixing, dissolving and frothing. The mixture is then usually frothed by a rotor in a whipping chamber to reconstitute the beverage and produce foam. The beverage is then usually evacuated from the whipping chamber through the bottom of the chamber and dispensed into a receptacle for drinking.

In the prior art different types of whipping chambers have been developed for improving the quality of the foam of beverages. EP 1 476 060 and EP 1 639 924 describe similar whipping chambers in which the rotors present a tapered shape. Grooves or ribs are present on the rotors surfaces whereas the back wall of the whipping chamber can presents protrusions or ribs. These whipping chambers were conceived for frothing various soluble powder ingredients; in particular these chambers were configured for frothing milk beverages as well as coffee beverages depending on the speed of actuation of the rotor. Consequently these whipping chambers are not particularly optimized for the frothing of milk. Besides due to the presence of fine grooves on the rotor and ribs on the back wall these whipping chambers cannot be easily rapidly cleaned.

WO 2003/005868 describes a whipping chamber wherein the internal wall surface of the chamber comprises indentations. Due to these indentations cavitations are created when the rotor is activated. The rotor can also present breakers. This whipping chamber can be indifferently used for the preparation of lattes, cappuccinos or espressos and consequently this whipping chamber is not particularly optimized for the frothing of milk.

WO 2008/013452 describes a whipping chamber wherein the internal wall of the chamber comprises ribs in particular near the outlet of the chamber so as to maintain the beverage in the chamber as long as possible and avoids that instant powder lumps are present in the final beverage. This dispenser induces a longer time of dispensing of the beverages since the beverage is maintained in the whipping chamber as long as the rotor is actuated. It means that the customer has to wait for a longer time before having his beverage totally dispensed in the drinking cup. For example for the preparation of a cappuccino beverage which requests first the dispensing of a frothy milk and then the dispensing of a coffee in the frothy milk, the sum of the time for frothing the milk, then for dispensing the milk with the same whipping chamber induces a too long dispensing time for the customer. Again this whipping chamber is used for the preparation of various different beverages in particular soup, coffee, hot cocoa, tea, lemonade and fruit juices and is not particularly dedicated to the preparation of milk beverages with a high quality of foam.

Today there is an increasing demand of the customers for specialty beverages based on milk and especially based on frothed milk like cappuccino, latte macchiato or cocoa based beverages. The properties of the milk foam of these beverages play an important role in the quality of the final beverage shall it concerns the visual aspect or the mouthfeel of the beverage. In particular these beverages can be well prepared if the milk foam presents the following specific properties:

- the volume of foam must be sufficient. For example, in a latte macchiato recipe one third of the beverage volume must be composed of milk foam. It is then important to get a high ratio of milk foam compared to milk liquid.
- the foam must be dense. It means that it must look like a microfoam with a very tiny bubble size. This quality is important when a layered beverage is produced such as a latte macchiato because dense foam helps for slowing down the flow of coffee and preventing said flow from falling down to the bottom of the drinking receptacle, which must remain white for the layering effect. Besides a dense white foam is essential for realising latte art on the top of the beverage.
- the foam must present an homogeneous aspect with bubbles of uniform small size. This quality participates to the nice visual aspect of the foam and to the nice mouthfeel.
- the foam must present a shiny appearance for the visual aspect,
- the foam must be creamy. This property is linked to the degree of stiffness of the foam which must remains sufficiently liquid and not rigid. This can be reached by incorporating a lot of liquid in the foam which means producing very small bubbles to get a smaller air/liquid ratio.
- the foam must be stable so that the foam remains present all along the time during which the customer drinks his beverage; the foam must keep its initial properties all along this time.

The qualities of the milk froth are different from those required for other frothed beverages like coffee espressos. The whipper chambers of the prior art have provided a good compromise being able to produce either a correct espresso crema or a correct milk froth with the same device. But none of the whipper chambers of the prior art has been able to provide a real high quality foamed milk.

The object of the present invention is to propose a mixing device dedicated to the foaming of milk in order to provide a high quality milk foam for the preparation of frothed milk beverages.

SUMMARY OF THE INVENTION

According to a first aspect, the invention concerns a mixing device comprising:

a whipper housing, a rotor and a back wall, the whipper housing and the back wall forming a whipper chamber in which is lodged the rotor, the whipper housing comprising a beverage inlet and a beverage outlet, a drive shaft for driving the rotor, said drive shaft being supported by the back wall, the rotor presenting a radial back surface facing the whipper housing back wall and a radial front surface opposed to the radial back surface the whipper housing comprising a front wall, said front wall facing the radial front surface of the rotor, and wherein the whipper housing front wall presents bumps elevating from the surface of the front wall, the upper surface of each bump being flat and the edges of said upper surface being sharp.

The mixing device of the present invention comprises a whipper housing and a back wall configured for forming a whipper chamber when they are assembled together. The device also comprises a rotor for whipping the beverage to be prepared such as an impeller or a rotating disk. The rotor is driven by a driveshaft supported by the back wall of the whipper assembly. The whipper housing presents a front wall that faces the radial front surface of the rotor. The whipper housing comprises a beverage inlet through which the different components of the beverage are introduced for being whipped by the rotor. The beverage inlet is generally present in the front wall of the whipper housing. The front wall preferably presents the form of a truncated cone tapering from the beverage inlet to the peripheral edge of the front wall. The whipper housing also presents a peripheral side wall globally parallel to the drive shaft. This peripheral side wall globally presents the form of a cylinder. It surrounds the peripheral edge of the rotor. The whipper housing also comprises a beverage outlet through which the beverage whipped by the rotor is evacuated. A conduit or nozzle can be attached to the beverage outlet for dispensing in a drinking cup.

In the present invention:
the term "back" refers to the parts of the mixing device near from the back wall supporting the rotor drive shaft,
the term "front" refers to the parts of the mixing device near from the whipper housing beverage inlet,
the terms "radial" and "axial" are defined in relation to the axis of rotation of the rotor.

According to the invention the whipper housing front wall presents bumps elevating from its surface. These bumps elevate from the whipper housing front wall surface that faces the front surface of the rotor. Then these bumps face the front surface of the rotor too. The upper surface of each bump—that is the most elevated part of the bump above the whipper housing front wall surface—is flat and the edges of said upper surface is sharp.

According to the preferred embodiment the beverage outlet is positioned at the lowest position of the whipper housing front wall.

Preferably the bumps are regularly radially disposed on the whipper housing front wall around the rotor central axis, except in the area of the beverage outlet. In particular it is preferred that the edges of the both bumps surrounding the beverage outlet are positioned at more than 2 mm from the edge of the beverage outlet, preferably at more than 5 mm, even more preferably at a distance of 9 mm.

Preferably all the bumps present the same shape and the same size.

It is preferred that each bump extends along the whole radial length of the front wall. As the beverage inlet of the mixing device usually corresponds to an axial opening in the whipper housing front wall it means that the bumps can radially extend on the front wall surface from the front wall opening corresponding to the inlet of the mixing device up to the peripheral edge of the front wall.

Preferably the upper surface of each bump is parallel to the front wall surface. Each bump appears like a local elevation of the front wall surface.

Preferably for each bump, its width is greater than its height.

According to the preferred embodiment the bumps present the shape of a quadrilaterally-faced hexahedra solid, such as a trapezoidal solid, a cuboid or a cube. It has been noticed that such solids presenting a flat upper side, flat elevating faces and straight edges efficiently improved the formation of foam of quality. The bumps preferably present the shape of a cuboid that is a quadrilaterally-faced hexahedra solid composed of three pairs of rectangles.

The width and the number of bumps on the whipper housing front wall can vary. The sum of the surfaces of all the bumps is generally comprised between 20 and 75% of the whipper housing front wall surface, preferably between 25 and 50%, even more preferably between 30 and 40%.

The front wall can comprises 3 to 11 bumps, preferably between 5 and 11 bumps, and according to the preferred embodiment 7 bumps.

The bumps can rise up between 0.5 and 2 mm above the front wall surface, preferably between 0.8 and 1.3 mm.

According to a specific embodiment the mixing device can comprise a dissolution chamber attached to the beverage inlet of the whipper housing. The dissolution chamber and the whipper housing can be moulded in one single piece. The outlet of the dissolution chamber comes out in the whipper housing. Preferably the dissolution chamber comprises at least an inlet for a beverage ingredient and an inlet for a diluent.

According to the preferred embodiment the rotor is a disc presenting four grooves radially extending on its radial front surface, said grooves being equally distanced one from the other. Preferably these grooves extend from the centre of the disc to the periphery of the disc and present a depth comprised between 1 and 2 mm and a width comprised between 2 and 6 mm.

Preferably the rotor has a radial front surface with a shape substantially corresponding to the whipper housing front wall surface. The shear gap between the rotor radial front surface and the whipper housing front wall surface is preferably of at most 1 mm.

Particular good results have been obtained for a mixing device such as described hereabove wherein:
the beverage outlet is positioned at the lowest point of the whipper housing front wall surface, and
the whipper housing front wall presents seven bumps equally positioned on the front wall surface around the beverage outlet, and
the seven bumps present the same cuboid shape, and
the seven bumps rise up between 0.8 and 1.3 mm above the front wall surface, and
the sum of the surfaces of all the bumps represents 30 to 40% of the whipper housing front wall surface, and
the rotor is a disc presenting four grooves radially extending on its radial front surface, said grooves being equally distanced one from the other.

According to the invention particular good results have been obtained with a mixing device such as described hereabove wherein the whipper housing front wall presents a truncated cone shape tapering from a diameter of about 38 mm to about 26 mm and wherein the rotor presents a diameter of about 25 mm. Yet any other smaller or bigger mixing device presenting the same proportional ratio between the different diameters of the front wall truncated cone and the rotor are covered by the present invention.

According to a second aspect, the invention concerns a beverage dispenser comprising a mixing device such as described hereabove.

According to a third aspect, the invention concerns a method for preparing a frothy beverage by using a mixing device such as described hereabove, wherein a beverage ingredient and a diluent are introduced into the mixing device and the rotor is rotated.

Preferably the beverage ingredient is a milk powder or a cocoa powder.

Preferably the diluent is water.

According to the preferred method the rotor is rotated at a speed of at least 10000 rpm, preferably at least 11000 rpm.

According to a fourth aspect, the invention concerns the use of a mixing device such as described hereabove for preparing a frothed cocoa beverage or a frothed milk beverage.

BRIEF DESCRIPTION OF THE DRAWINGS

The characteristics and advantages of the invention will be better understood in relation to the following figures.

DETAILED DESCRIPTION OF THE DRAWINGS

Figure 1:
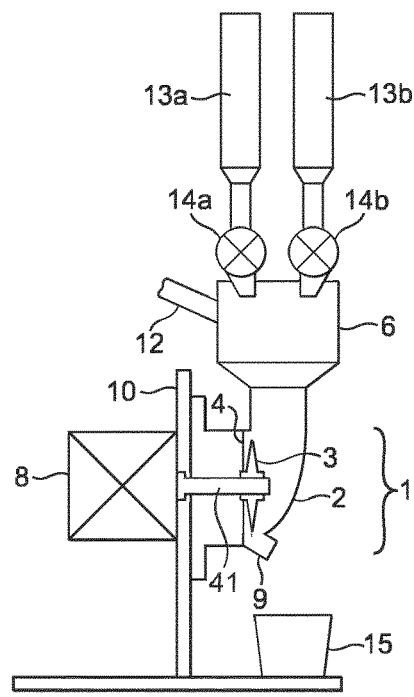
FIG. 1 represents a beverage dispenser comprising a mixing device.

With reference to FIG. 1 the beverage dispenser comprises two food ingredient storing units 14a, 14b connected to respective dosing units 13a, 13b able to provide food ingredient doses to a common dissolution chamber 6. According to another embodiment the beverage dispenser can comprise a single dosing unit connected to the different storing units. The storing units 14a, 14b can be a disposable tank like a cartridge, a can or tin, a pouch, . . . or it can be a non disposable canister that is refilled with powder food ingredients.

The food ingredient can be any ingredient that forms a beverage when mixed with a liquid diluent. It can be a soluble powder or a soluble liquid concentrate. According to the invention it is preferably chocolate or milk. When different storing units are present, they preferably contain different food ingredients.

The dosing units comprise means for dosing the food ingredient. This means can be a dosing screw, a dosing auger, perforated discs or a peristaltic pump for a beverage concentrate. The dosing units are placed at the bottom of the storing units to receive the beverage ingredient therefrom by gravity.

The dose of food ingredient issued from a dosing unit 13a, 13b is delivered to the dissolution chamber 6 where it is mixed with a diluent, usually water, introduced from a diluent inlet 12. The shape of the chamber 6 and the orientation of the diluent inlet 12 are such that the diluent creates a sufficiently turbulent stream that helps the dissolution of the food ingredient in the diluent in the chamber. The mixture of the dissolved food ingredient is then introduced in a mixing device 1 comprising a whipper housing 2 and a back wall 4. The assembly of the whipper housing 2 and the back wall 4 forms a chamber in which is lodged a rotor 3 such as an impeller. The rotor is connected to a drive shaft 41 fixed to the frame 10 of the dispenser. The drive shaft is actuated by a motor 8. The whipped beverage leaves the mixing device 1 through an outlet 7 that can be connected to an outlet tube 9 and is delivered in a cup 15.

Figure 2:
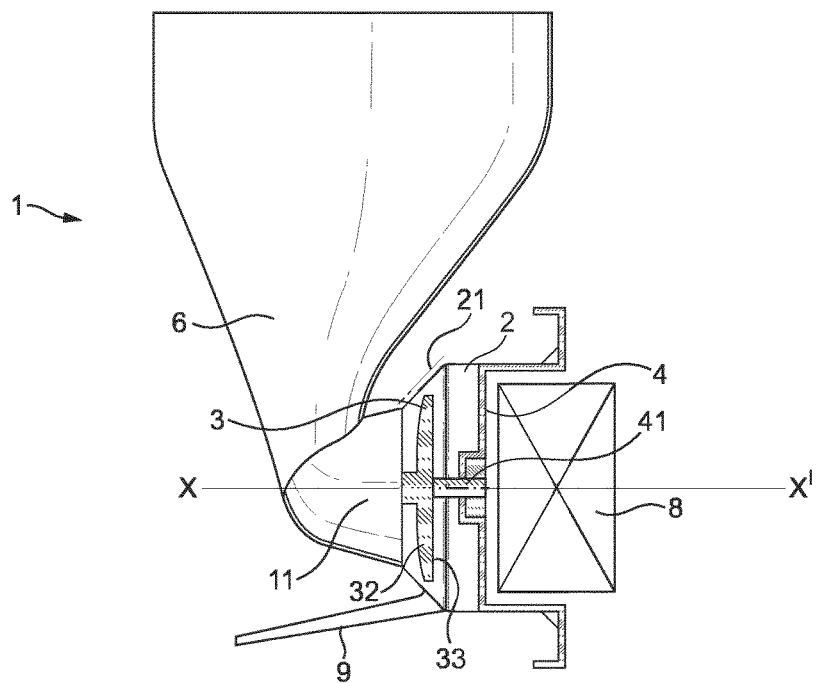
FIG. 2 represents a mixing device in which the features of the present invention can be implemented.

FIG. 2 is a more detailed view of a mixing device 1 susceptible to be implemented in the dispenser of FIG. 1. The mixing device 1 comprises the whipper housing 2, the rotor 3 and the back wall 4. The whipper housing and the back wall forms a whipper chamber in which is lodged the whipper rotor. The rotor 3 is attached to a drive shaft 41 and the drive shaft is supported by the back wall 4. The drive shaft 41 is connected to and actuated by a motor 8. The rotor 4 presents a radial back surface 33 that faces the whipper housing back wall 4 and a radial front surface 32 opposed to the radial back surface. The rotor front surface 32 faces the inlet of the mixing device 11. The whipper housing comprises a front wall 21 (underlined by a dotted line) at the inlet of the mixing device. The front wall presents an opening 22 corresponding to the inlet 11 of the mixing device. The front wall 21 radially tapers from its peripheral edge to the edge of the opening 22; preferably the front wall present the shape of a truncated cone. The whipper housing comprises a peripheral side wall 23 that extends from the peripheral edge of the front wall and parallel to the axis XX'. The end of the peripheral side wall leans on the back wall 4 to close the mixing chamber. The inlet 11 of the whipper housing is attached to the dissolution chamber 6. The whipper housing and the dissolution chamber can be made of one integral single piece of material.

Figure 3:
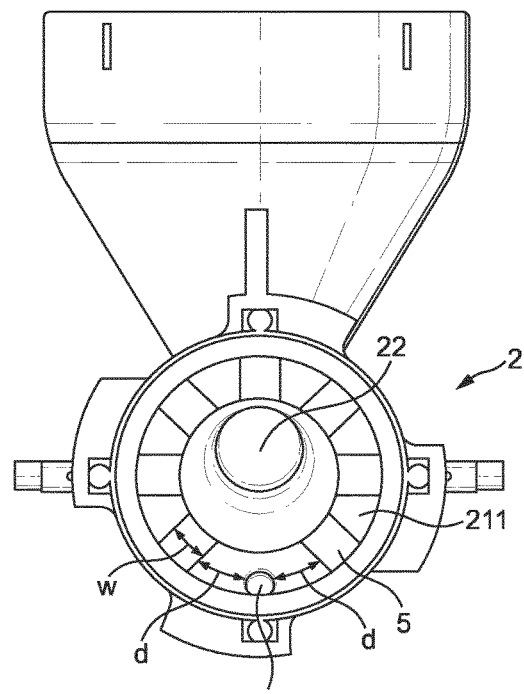
FIGS. 3 and 4 are back and perspective views of the whipper housing of the mixing device according to the preferred embodiment of the present invention.
Figure 4:
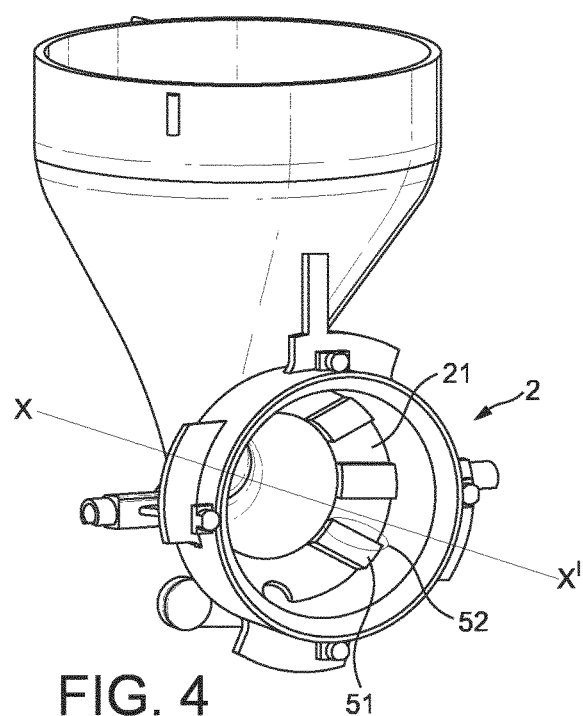

FIGS. 3 and 4 illustrate a whipper housing 2 presenting the features of the present invention. The front wall 21 presents bumps 5 elevating from its surface 211. The upper surface of each bump is parallel to the front wall surface so that each bump appears like a local elevation of the front wall surface.

In the illustrated preferred embodiment the front wall present seven bumps. All the bumps present the same shape of a cuboid with a flat top surface 51 and flat side surfaces with sharp edges between said different surfaces. For the best foaming of milk the edges of the bumps must not be curved or smooth. All the bumps preferably present the same size. The bumps preferably extend from the whole axial length of the whipper housing front wall surface 211 that is from the opening 22 to the peripheral edge of the front wall. According to the invention no bump is present on the whipper housing peripheral side wall that is parallel to the axis XX'. For each bump, its width is greater than its height. Due to the small height of the bumps above the front wall surface 211 (between 0.5 and 2 mm, preferably between 0.8 and 1.3 mm), the bumps present the shape of rectangular plates elevating from the surface 211 of the whipper housing front wall. The outlet 7 of the whipper housing is positioned at the lowest part of the front wall and the seven bumps 5 are equally positioned on the front wall surface 211 around the outlet 7. Globally the sum of the surfaces of all the bumps is around 35% of the whipper housing front wall surface. According to the preferred embodiment the two bumps surrounding the beverage outlet must not be directly adjacent to said outlet. Preferably these two bumps are positioned at a distance d of at least 2 mm, preferably at least 5 mm, from the beverage outlet. According to the preferred embodiment these two bumps are positioned at a distance d of 9 mm. This configuration enables the preparation of frothed milk from a soluble milk powder and water with foam of high quality and in a short time. Consequently it enables the production of long foamy milk beverages in a short time. The outlet of the whipper housing comprises a tube that is slightly oriented downwards to help for the evacuation of the beverage.

Figure 5:
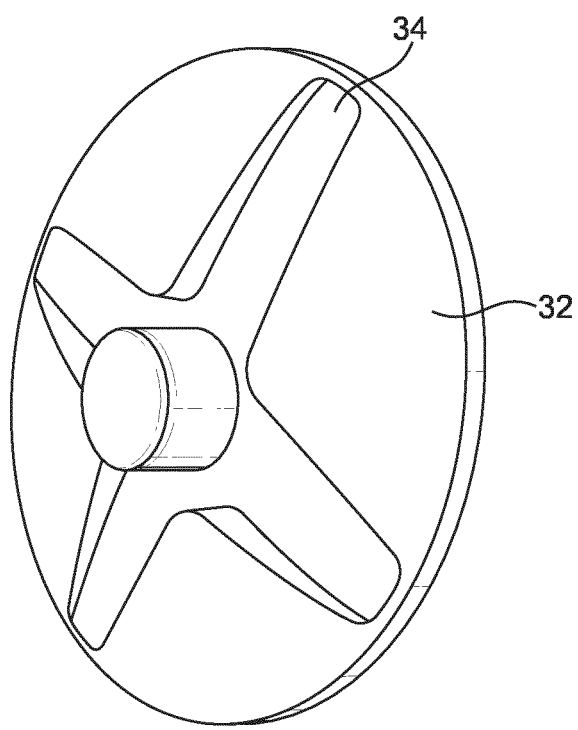
FIG. 5 illustrates a rotor according to a preferred embodiment of the present invention.

FIG. 5 illustrates the rotor that is preferably used with the mixing device of the present invention and in particular with the whipper housing of FIGS. 3 and 4. The rotor is a disc of which front face 32 comprises four grooves 34. These grooves are equally distanced one from the other. Preferably these grooves extend from the centre of the disc to the periphery of the disc and present a depth comprised between 1 and 2 mm and a width comprised between 2 and 6 mm.

According to the invention particular good results have been obtained with a mixing device such as described in FIGS. 3, 4 and 5 wherein the whipper housing front wall presents a truncated cone shape tapering from a diameter of about 38 mm to about 26 mm and wherein the rotor presents a diameter of about 25 mm.

Milk foam of particular good quality has been produced with the rotor and the whipping chamber such as described hereabove, the rotor rotating at a speed of about 11500 rpm.

The mixing device of the present invention presents the advantage of providing frothed milk with high quality foam presenting a high volume, a high density, a shiny appearance, homogeneous small sized bubbles, a high stability and a creamy and natural texture.

The invention claimed is:

1. A mixing device comprising:
a whipper housing comprising a beverage inlet, a beverage outlet, and a front wall, the front wall comprises bumps elevated from a surface of the front wall, an upper surface of each bump is flat, edges of the upper surface are sharp, and the upper surface of each bump is parallel to the surface of the front wall;
a rotor;
a back wall, the whipper housing and the back wall forming a whipper chamber in which is lodged the rotor, the rotor comprising a radial back surface facing the back wall and a radial front surface opposed to the radial back surface, the radial front surface facing the front wall of the whipper housing; and
a drive shaft configured to drive the rotor, the drive shaft supported by the back wall.

2. The mixing device according to claim 1, wherein the beverage outlet is positioned at the lowest position of the front wall of the whipper housing.

3. The mixing device according to claim 1, wherein the bumps are regularly positioned on the front wall around a rotor central axis except in the beverage outlet.

4. The mixing device according to claim 1, wherein all the bumps have the same shape and size.

5. The mixing device according to claim 1, wherein each bump extends along a whole radial length of the front wall.

6. The mixing device according to claim 1, wherein for each bump, a width is greater than a height.

7. The mixing device according to claim 1, wherein the bumps comprise a quadrilaterally-faced hexahedra solid shape.

8. The mixing device according to claim 1, wherein a sum of surfaces of all the bumps is between 20 and 75% of the surface of the front wall of the whipper housing.

9. The mixing device according to claim 1, wherein the front wall comprises 3 to 11 bumps.

10. The mixing device according to claim 1, wherein the bumps are elevated between 0.5 and 2 mm above the surface of the front wall.

11. The mixing device according to claim 1, comprising a dissolution chamber attached to the beverage inlet of the whipper housing.

12. The mixing device according to claim 1, wherein the rotor is a disc comprising four grooves radially extending on the radial front surface, the grooves being equally distanced one from the other.

13. The mixing device according to claim 1, wherein the beverage outlet is positioned at the lowest point of the front wall of the whipper housing, the front wall of the whipper housing comprises seven bumps equally positioned on the surface of the front wall around the beverage outlet,
the seven bumps comprise the same cuboid shape,
the seven bumps are elevated between 0.8 and 1.3 mm above the surface of the front wall,
a sum of surfaces of the bumps represents 30 to 40% of the surface of the front wall, and
the rotor is a disc comprising four grooves radially extending on the radial front surface, the grooves being equally distanced one from the other.

14. The mixing device according to claim 1, wherein the front wall of the whipper housing comprises a truncated cone shape tapering from a diameter of about 38 mm to about 26 mm, and the rotor has a diameter of about 25 mm.

15. A beverage dispenser comprising a mixing device comprising:
a whipper housing comprising a beverage inlet, a beverage outlet, and a front wall comprising bumps elevated from a surface of the front wall, an upper surface of each bump is flat, edges of the upper surface are sharp, and the upper surface of each bump is parallel to the surface of the front wall;
a rotor;
a back wall, the whipper housing and the back wall forming a whipper chamber in which is lodged the rotor, the rotor comprising a radial back surface facing the back wall and a radial front surface opposed to the radial back surface, the radial front surface facing the front wall of the whipper housing; and
a drive shaft configured to drive the rotor, the drive shaft being supported by the back wall.

16. A method for preparing a frothy beverage, the method comprising:
introducing a beverage ingredient and a diluent into a mixing device comprising
a whipper housing comprising a beverage inlet, a beverage outlet, and a front wall comprising bumps elevated from a surface of the front wall, an upper surface of each bump is flat, edges of the upper surface are sharp, the upper surface of each bump is parallel to the surface of the front wall,
a rotor,
a back wall, the whipper housing and the back wall forming a whipper chamber in which is lodged the rotor, the rotor comprising a radial back surface facing the back wall of the whipper housing and a radial front surface opposed to the radial back surface, the radial front surface facing the front wall of the whipper housing, and
a drive shaft configured to drive the rotor, the drive shaft being supported by the back wall; and
rotating the rotor.

17. The method according to claim 16, wherein the beverage ingredient is a milk powder or a cocoa powder.

18. The method according to claim 16, wherein the rotor is rotated at a speed of at least 10000 rpm.

19. A method for preparing a frothed cocoa beverage or a frothed milk beverage comprising:
   introducing a cocoa or froth milk beverage ingredient into a mixing device comprising
   a whipper housing comprising a beverage inlet, a beverage outlet, and a front wall comprising bumps elevated from a surface of the front wall, an upper surface of each bump is flat, edges of the upper surface are sharp, the upper surface of each bump is parallel to the surface of the front wall,
   a rotor,
   a back wall, the whipper housing and the back wall forming a whipper chamber in which is lodged the rotor, the rotor comprising a radial back surface facing the back wall of the whipper housing and a radial front surface opposed to the radial back surface, the radial front surface facing the front wall of the whipper housing, and
   a drive shaft configured to drive the rotor, the drive shaft being supported by the back wall; and
   rotating the rotor to prepare the frothed cocoa or milk beverage.

* * * * *